(12) United States Patent
Jaworowski et al.

(10) Patent No.: US 8,283,044 B2
(45) Date of Patent: Oct. 9, 2012

(54) CONVERSION COATINGS WITH CONDUCTIVE ADDITIVES, PROCESSES FOR APPLYING SAME AND THEIR COATED ARTICLES

(75) Inventors: Mark R. Jaworowski, Glastonbury, CT (US); Sarah Arsenault, Vernon, CT (US); James T. Beals, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 1172 days.

(21) Appl. No.: 11/832,239

(22) Filed: Aug. 1, 2007

(65) Prior Publication Data

US 2009/0035473 A1 Feb. 5, 2009

(51) Int. Cl.
*B32B 15/04* (2006.01)
*B32B 27/00* (2006.01)
*B05D 3/02* (2006.01)
*B05B 1/18* (2006.01)

(52) U.S. Cl. .................. 428/500; 428/457; 427/372.2; 427/284; 427/388.1; 427/430.1

(58) Field of Classification Search .................. None
See application file for complete search history.

(56) References Cited

U.S. PATENT DOCUMENTS

| 3,330,697 | A | | 7/1967 | Pechini |
| 4,812,363 | A | | 3/1989 | Bell et al. |
| 5,639,565 | A | * | 6/1997 | Boyd et al. .................. 428/628 |
| 5,643,499 | A | * | 7/1997 | Boyd et al. .................. 252/387 |
| 5,871,839 | A | * | 2/1999 | Boyd et al. .................. 428/328 |
| 6,150,032 | A | * | 11/2000 | Yang et al. .................. 428/457 |
| 6,153,022 | A | | 11/2000 | Yoshida et al. |
| 6,222,166 | B1 | | 4/2001 | Lin et al. |
| 6,451,443 | B1 | | 9/2002 | Daech |
| 6,537,678 | B1 | | 3/2003 | Putnam et al. |
| 6,558,480 | B1 | | 5/2003 | Rochfort et al. |
| 6,613,390 | B2 | | 9/2003 | Jaworowski et al. |
| 6,764,553 | B2 | | 7/2004 | Dolan |
| 6,821,633 | B2 | | 11/2004 | Liu et al. |
| 6,972,098 | B1 | | 12/2005 | Viswanathan |
| 7,250,193 | B2 | | 7/2007 | Matsukawa et al. |
| 2004/0166435 | A1 | * | 8/2004 | Lee et al. .................. 430/270.1 |
| 2006/0134339 | A1 | | 6/2006 | Wang et al. |

FOREIGN PATENT DOCUMENTS

| EP | 0837112 A2 | 4/1998 |
| WO | 02/072682 A1 | 9/2002 |
| WO | 03/027203 A2 | 4/2003 |
| WO | 2004/016698 A1 | 2/2004 |

OTHER PUBLICATIONS

European Search Report for EP 08252602.1, dated Oct. 17, 2008.
Bulent E. Yoldas, Alumina Sol Preparation from Alkoxides, American Ceramic Society Bulletin, 54(3):289-90 1975.

* cited by examiner

*Primary Examiner* — Sheeba Ahmed
(74) *Attorney, Agent, or Firm* — Bachman & LaPointe, P.C.

(57) ABSTRACT

A coating composition includes a conductive polymer including at least one of the following: a single conductive polymer, a dual strand conductive polymer, a combination of a single conductive polymer and a dual strand conductive polymer or an organic-inorganic hybrid composite.

14 Claims, 3 Drawing Sheets

CONVERSION COATINGS WITH CONDUCTIVE ADDITIVES, PROCESSES FOR APPLYING SAME AND THEIR COATED ARTICLES

FIELD OF THE INVENTION

The invention relates to conversion coatings and, more particularly, relates to conversion coatings with conductive additives.

BACKGROUND OF THE INVENTION

Aluminum alloy conversion coatings provide a combination of corrosion inhibition and apparent surface electrical conductivity. Current state-of-the art trivalent chromium conversion coatings do not demonstrate stable surface conductivity. Evidence exists that hexavalent chromate conversion coatings do not impart true electronic conductivity, but provide metal-to-metal contact due to localized failure of the passive film under load. The superb corrosion inhibition and passive film "self repair" provided by chromate conversion coatings permits them to be used in applications where surface conductivity is required. Due to their carcinogenic properties, however, hexavalent chromium coatings are heavily regulated and are thus to be avoided whenever possible.

SUMMARY OF THE INVENTION

In accordance with yet another aspect of the present invention, a coating composition broadly comprises a conductive polymer including at least one of the following: a single conductive polymer, a dual strand conductive polymer, a combination of a single conductive polymer and a dual strand conductive polymer or an organic-inorganic hybrid composite.

In accordance with yet another aspect of the present disclosure, a process for coating an article broadly comprises contacting an aluminum-based article with a solution, said solution includes a solvent and a conductive polymer having at least one of the following: a single conductive polymer, a dual strand conductive polymer, a combination of a single conductive polymer and a dual strand conductive polymer; and drying a coated aluminum-based part or an organic-inorganic hybrid composite.

In accordance with yet another aspect of the present invention, a coated article broadly comprises an article includes at least one surface having a coating disposed thereupon, wherein said coating includes at least one conductive polymer bonded to at least one intermetallic particle of said at least one surface, wherein said at least one conductive polymer includes at least one of the following: a single conductive polymer, a dual strand conductive polymer, a combination of a single conductive polymer and a dual strand conductive polymer or an organic-inorganic hybrid composite.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Generally, it is widely recognized that aluminum-based parts are not homogeneous throughout and contain intermetallic particles such as copper, manganese, iron, silicon, zinc, magnesium, chromium, titanium, and the like, depending upon the type of alloy, as known to one of ordinary skill in the art. Intermetallic particles exposed at the surface of an aluminum-based part serve as active corrosion site(s). The exemplary conversion coatings described herein contain a conductive phase capable of binding directly to the exposed intermetallic particles and preventing corrosion from occurring. An exemplary conversion coating described herein may contain a non-conductive phase and an electrically conductive phase. Generally, the non-conductive phase may be a typical metal oxide or metal oxide mixture, while the conductive phase may be a conductive polymer, for example, a single conductive polymer or a dual strand conductive polymer, combined with an inorganic inhibitor species or a film forming agent. The conductive phase may bond to the intermetallic particles and extend through a barrier phase to the free surface of the coating.

As used herein, the terms "non-conductive phase" and "non-conductive material" may include any one or more of the following non-conductive materials: metal oxides; metal oxide mixture; metal oxides of an alloy(s) of an article; and the like. For example, representative metal oxides may include a metal from the metalloids, also known as the "poor metals", of the Periodic Table of Elements as shown in the Handbook of Chemistry and Physics, CRC Press, 71$^{st}$ ed., p. 1-10 (1990-91), such as aluminum, gallium, germanium, indium, tin, lead, boron, silicon and bismuth, with aluminum oxides, indium oxides and tin oxides being the most commonly utilized oxides as known to one of ordinary skill in the art.

Figure 2:
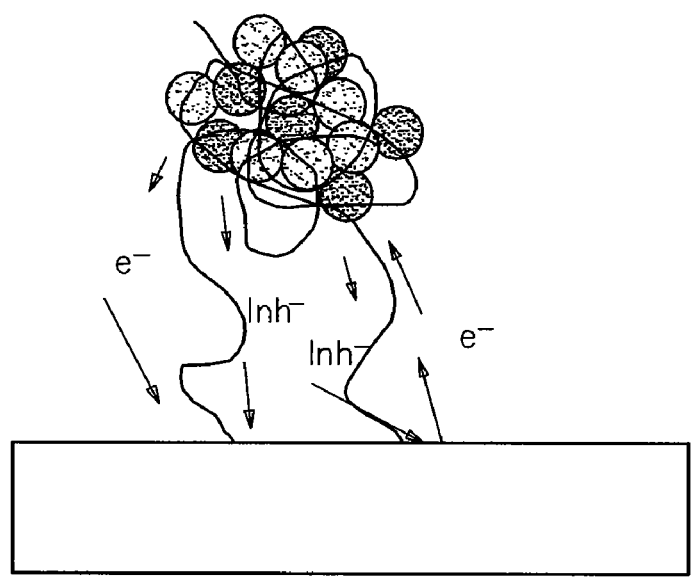
FIG. 2 is a representation of an exemplary conductive polymer embodying an organic-inorganic composite hybrid containing an inorganic inhibitor species.
Figure 3:
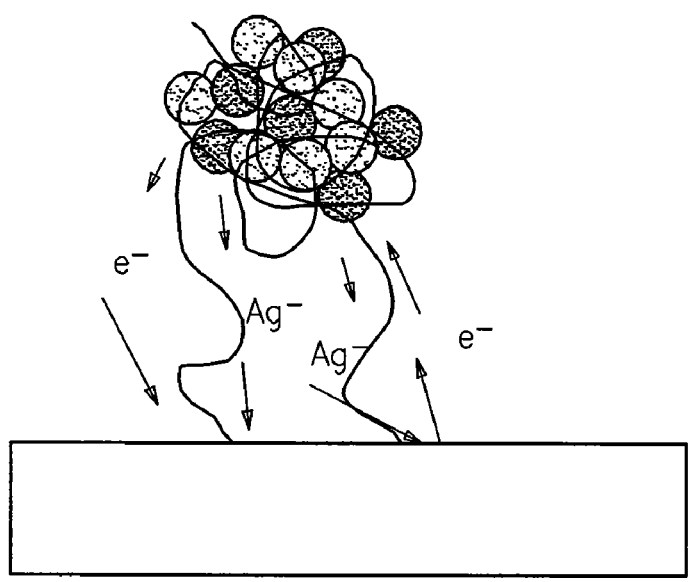
FIG. 3 is a representation of another exemplary conductive polymer embodying an organic-inorganic composite hybrid containing a film forming agent.

As used herein, the term "conductive polymer" means either a single conductive polymer, a dual strand conductive polymer, a combination of a single conductive polymer or a dual conductive polymer or an organic-inorganic composite hybrid composed of a conductive organic component and an inorganic component, where the conductive organic component may comprise an aforementioned conductive polymer inorganic component may comprise an inorganic inhibitor species (See FIG. 2) or a film forming agent (See FIG. 3). Suitable single conductive polymers may include polyaniline, polyacetylene, polypyrrole, polythiophene, poly(phenylene vinylene), and the like. Suitable dual strand conductive polymers may include at least one of the following polymers: polyaniline, polyacetylene, polypyrrole, polythiophene, and poly(phenylene vinylene), bonded to a polyanion, wherein the bond is not a covalent bond. The conductive polymer may include at least one terminal end having a coupling agent attached thereto.

As used herein, the term "coupling agent" means a functional group bonded to the terminal end of a conductive polymer. For example, the terminal end functional group of the conductive polymer may include any one of the following: beta-diketones, mercaptoesters, benzotriazoles, benzothiazoles, amines, and carboxylic acids, combinations comprising at least one of the foregoing, and the like. Generally, these functional groups are recognized for their ability to enhance the adhesive bond strength of thermoset resins to metallic substrates. The resultant electrically conductive polymer film is covalently bonded to the article's surface, and bonded at a relatively high density to intermetallic particles on the article's surface. When employing conductive polymers having such functional groups, the molecular geometry of the conductive polymers may be branched or dendritic.

As used herein, the term "inorganic inhibitor species" means a selective inhibitor species that precipitates a layer of non-conductive material ($Inh^-$ shown in FIG. 2) upon a surface of an active corrosion site. Inorganic inhibitor species are generally known for their inhibitive and/or self-healing properties as known to one of ordinary skill in the art. Suitable inorganic inhibitor species for use herein are described and disclosed in U.S. Pat. No. 6,537,678 to Putnam et al., which is incorporated by reference herein in its entirety. For example, inorganic inhibitor species may include metals of Groups V, VI and the lanthanide series of metals of the aforementioned Periodic Table of Elements as referenced above.

As used herein, the term "film forming agent" means a selective agent that precipitates a non-conductive material ($Ag^-$ shown in FIG. 3) to form a barrier film upon the entirety of a surface. Suitable film forming agents for use herein may be oxides of metals of Groups IV, V and VI of the aforementioned Periodic Table of Elements as referenced above. For example, some suitable film forming agents for use herein may be titanium oxide, titanium dioxide, hafnium oxide, hafnium dioxide, zirconium oxide, zirconium dioxide, and the like.

Figure 1:
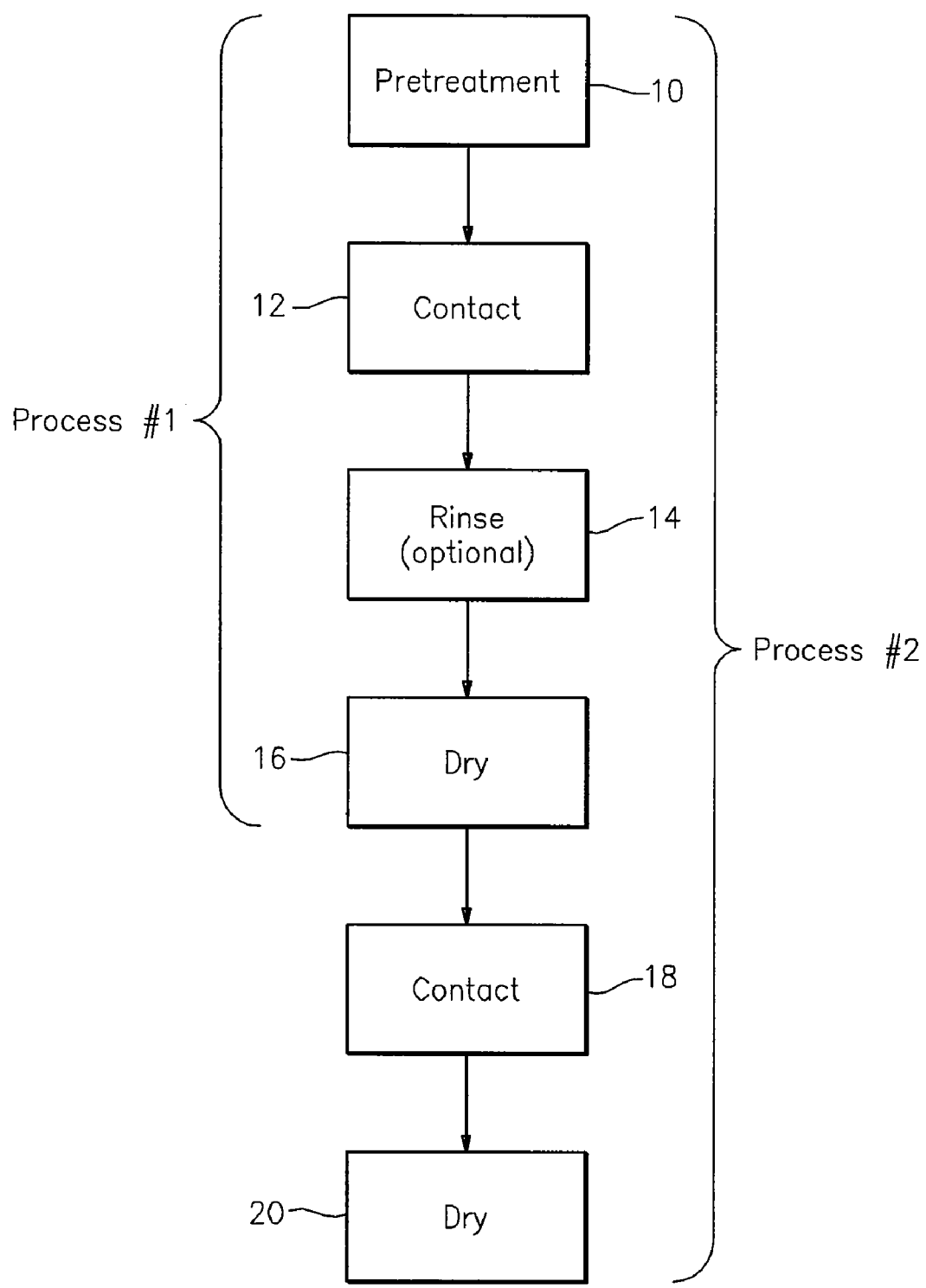
FIG. 1 is a flowchart illustrating the steps of two exemplary processes described herein.

Referring now to FIG. 1, a representative flowchart illustrating two exemplary processes described herein are shown. Generally, process #1 may be utilized to form an exemplary embodiment of a coated article (See FIG. 4) as well as serve as precursor steps to performing process #2. Process #2 may be utilized to form another exemplary embodiment of another coated article (See FIG. 5). In preparation of being coated, an article, e.g., an aluminum-based part, may optionally undergo pretreatment at step 10, such as an abrasive cleaning technique, e.g., deoxidizing, degreasing, and the like, followed by optional rinsing and drying steps as known to one of ordinary skill in the art. For example, one or more surfaces to be coated may be abrasively treated. Afterwards, the abrasively cleaned article may be washed in a mild detergent, and then rinsed with tap water, deionized water or ethanol as known to one of ordinary skill in the art. In addition, a chemical etch or deoxidizing surface treatment step followed by a water rinse may also optionally be applied after washing in a mild detergent as known to one of ordinary skill in the art.

After pretreating the article, the article may be contacted at step 12 with a solution comprising a solvent, a non-conductive material and a conductive polymer. As described herein, the conductive polymer may have at least one coupling agent bonded thereto or may be free of the coupling agent. In an alternative embodiment, when the conductive polymer is free of a coupling agent, the coupling agent may be added to the solution such that the solvent, conductive polymer and at least one coupling agent may combine to form an emulsion. Given the various embodiments and alternatives, suitable solvents may include any solvent that can dissolve the conductive polymer, non-conductive material and the optional coupling agent.

Suitable contacting techniques may include immersion, spraying, brushing, combinations comprising at least one of the foregoing processes, and the like. When utilizing an emulsion, one of ordinary skill in the art may adapt the contacting technique as recognized in order to form the electrically conductive material coating upon the surface of the article.

During the contacting process, the pH may fluctuate throughout the process due to the sensitive nature of the chemistries involved as known to one of ordinary skill in the art. The solution may be monitored to maintain a pH range of about 3.5 to about 10.5. The article may be immersed within the solution for a period of time of about 1 minute to about 10 minutes to form the electrically conductive coating.

During step 12, the layer of non-conductive material forms in situ, that is, a layer of a metal oxide, as a reaction byproduct of the contacting processes described above. When an organic-inorganic hybrid composite is not utilized as the conductive polymer, the non-conductive material of the solution or emulsion serves as the starting material for the resultant non-conductive material layer. When an organic-inorganic hybrid composite is utilized as the conductive polymer, the inorganic inhibitor species or film forming agent provide the starting material for the resultant non-conductive material layer. In the meantime, the conductive polymer, with or without the use of a coupling agent, binds to the intermetallic particles present in the article's surface. As recognized by one of ordinary skill in the art, the conductive polymer is in the form of strands such that at least one terminal end binds to an intermetallic particle while at least one other terminal end remains unattached. The unattached terminal end is able to settle at or proximate to the surface of the layer of metal oxide, or non-conductive material layer, in order to form and act as an electrically conductive conduit between the surface of the non-conductive material layer and the article's surface.

After coating the article at step 14, the coated article may be rinsed at step 16 using any one of a number of techniques known to one of ordinary skill in the art and dried at step 18. Suitable drying techniques include conventional techniques such as by air, heating element, infrared element, combinations comprising at least one of the foregoing, and the like, as known to one of ordinary skill in the art. For example, the coated article may be dried at a temperature of about 25° C. (77° F.) to about 125° C. (257° F.) for a period of time of about 0.5 to about 24 hours.

Figure 4:
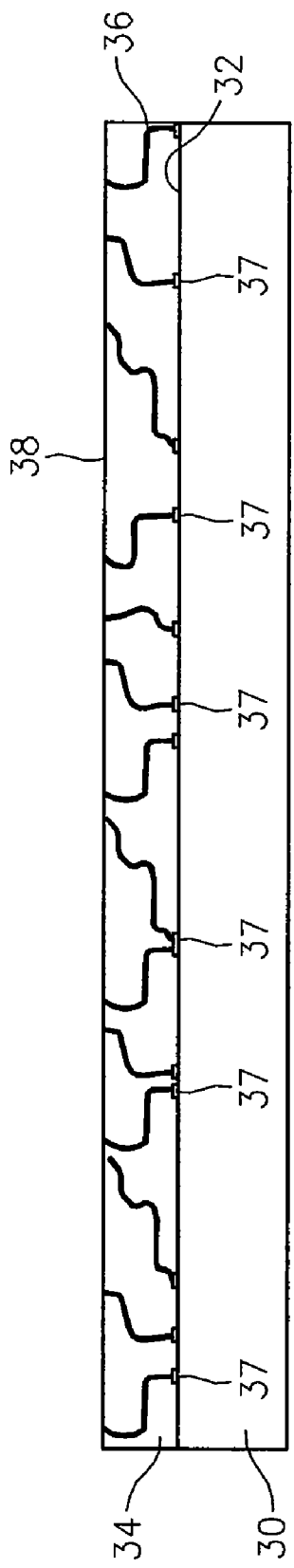
FIG. 4 is a representation of an exemplary coated article made in accordance with exemplary process #1 of FIG. 1.

Referring now to FIG. 4, a resultant coated article 30 of process #1 may comprise at least one surface 32 having disposed thereupon a non-conductive material layer 34 containing a plurality of electrically conductive polymer strands 36. As described above, the plurality of electrically conductive polymer strands 36 may be bonded to a plurality of intermetallic particles 37 present throughout the surface 32 and extending to and proximate to a surface 38 of the non-conductive material layer 34. The resulting non-conductive material layer 34 may have a thickness of about 50 nanometers to about 1000 nanometers.

As described above, the coated article may undergo further steps to form yet another exemplary embodiment of an exemplary process, exemplary coating and exemplary coated article described herein. The coated article of FIG. 2 may again be contacted with a solution comprising a solvent and an electrically conductive material, to form an electrically conductive layer upon the non-conductive layer containing the veined network of conductive polymer strands described above. The electrically conductive material may include a coupling agent or may be free of the coupling agent, such that the coupling may instead be an additive included in the solution or may not be included.

Suitable contacting processes may include immersion, air spray, electrostatic deposition, brush application, flood coating, chemical conversion, sol gel, cold spray, sputtering, vapor deposition, combinations comprising at least one of the foregoing, and the like, as known to one of ordinary skill in the art.

For example, a sol gel overlay coating solution may be prepared from a group IV metal based organic compound with the addition of a conductive polymer in the presence or absence of an alcohol, ketone, or similar solvents. For example, the group IV metal may be aluminum and the compound may be an aluminum isopropoxide compound. In this example, the gels are formed by processing metal alkoxides, first hydrolyzing and then polymerizing to form the gel as known to one of ordinary skill in the art. The group IV metal may comprise approximately 0 to approximately 90 weight % of the sol gel based upon the total atom % of the sol gel. During preparation, the pH of the sol gel is carefully controlled. Fracture of the non-conductive coating layer may be prevented through the addition of one or more chemical additives, such as surfactants, drying control chemical additives, and the like, and other processing techniques known to one of ordinary skill in the art. Once prepared, the sol gel may undergo an optional rinsing step (not shown) to thin the gel and displace any excess solvent present as known to one of ordinary skill in the art. The aluminum alloy articles may undergo a heat treatment at a temperature of up to about 125° C. (257° F.) to fully evaporate the gel and form a uniform coating. Heat treatment temperatures may be reduced by careful replacement of water with alcohols and other volatile solvents as known to one of ordinary skill in the art.

In the alternative, the overlay coating solution may be formed through traditional polymerization techniques to form a polymer gel with the entrapped conductive material and group IV metal as known to one of ordinary skill in the art. In this alternative example, multi-component oxides may be achieved by dissolving hydrous oxides or alkoxides together with polyhydroxy alcohol and a chelating agent. The introduction of this organic polymer component to the inorganic sol gel will lead to more flexible and functionalized films.

After coating the article at step 18, the coated article may be optionally rinsed (not shown) using any one of a number of techniques known to one of ordinary skill in the art and dried at step 20. Suitable drying techniques include conventional techniques such as by air, heating element, infrared element, combinations comprising at least one of the foregoing, and the like, as known to one of ordinary skill in the art. For example, the coated article may be dried at a temperature of about 25° C. (77° F.) to about 125° C. (257° F.) for a period of time of about 0.5 to about 24 hours.

Figure 5:
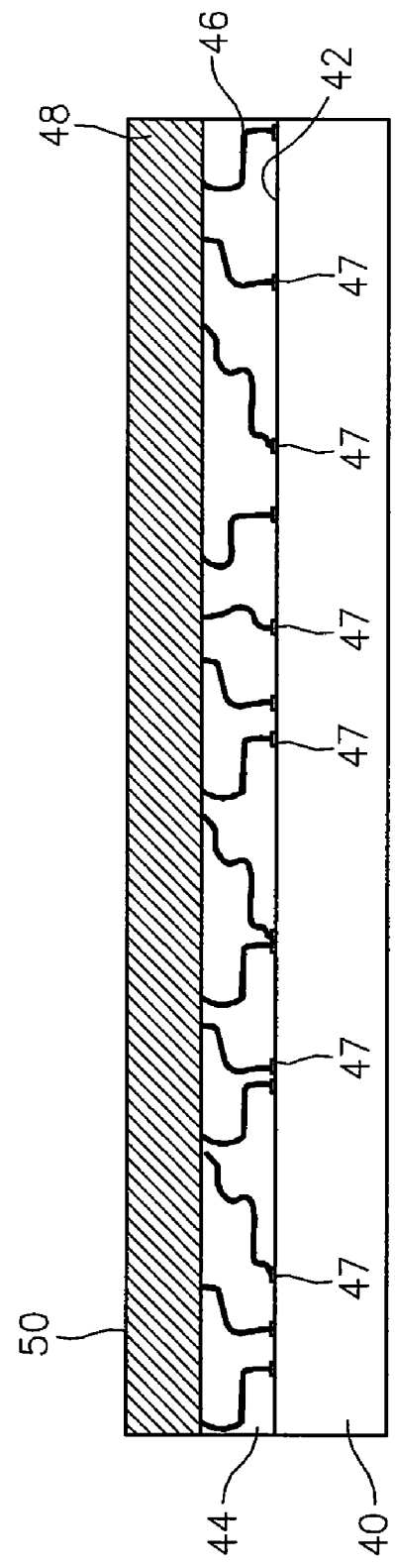
FIG. 5 is a representation of another exemplary coated article made in accordance with exemplary process #2 of FIG. 1.

Referring now to FIG. 5, a resultant coated article 40 of process #2 may have at least one surface 42 having disposed thereupon a non-conductive material layer 44 containing the aforementioned veined network of electrically conductive polymer strands 46 whereupon an electrically conductive overlay coating layer 48 may be disposed. As described above, the plurality of electrically conductive polymer strands 46 may be bonded to a plurality of intermetallic particles 47 present throughout the surface 42 and extending to and proximate to a surface 50 of the non-conductive material layer 44 and in contact with the electrically conductive overlay coating layer 48. The resulting electrically overlay coating layer 48 and non-conductive material layer 44 may have a combined thickness of about 50 nanometers to about 5000 nanometers.

One or more embodiments of the present invention have been described. Nevertheless, it will be understood that various modifications may be made without departing from the spirit and scope of the invention. Accordingly, other embodiments are within the scope of the following claims.

What is claimed is:

1. A coating composition, comprising:
a conductive polymer selected from the group consisting of a single conductive polymer, a dual strand conductive polymer, a combination of a single conductive polymer or a dual conductive polymer or an organic-inorganic hybrid composite comprising at least one inorganic inhibitor species selected from the group consisting of a metal of Group V, a metal of Group VI, an element from the lanthanide series, and mixtures thereof; or at least one film forming agent selected from the group consisting of an oxide of a metal of Group IV, an oxide of a metal of Group V, an oxide of a metal of Group VI and mixtures thereof, said conductive polymer including at least one terminal end having a coupling agent bonded thereto, wherein said coupling agent comprises any one of the following functional groups: beta-diketones, mercaptoesters, benzotriazoles, benzothiazoles, and carboxylic acids.

2. The coating composition of claim 1, wherein said single conductive polymer is selected from the group consisting of polyaniline, polyacetylene, polypyrrole, polythiophene, and poly(phenylene vinylene), and mixtures thereof.

3. A process for coating an article, comprising:
contacting an aluminum-based article with a solution, said solution includes a solvent and a conductive polymer selected from the group consisting of a single conductive polymer, a dual strand conductive polymer, a combination of a single conductive polymer and an organic-inorganic hybrid composite comprising at least one inorganic inhibitor species selected from the group consisting of a metal of Group V, a metal of Group VI, an element from the lanthanide series, and mixtures thereof; and at least one film forming agent selected from the group consisting of an oxide of a metal of Group IV, an oxide of a metal of Group V, an oxide of a metal of Group VI and mixtures thereof;
providing said conductive polymer with at least one terminal end and bonding a coupling agent to the terminal end, wherein said coupling agent comprises any one of the following functional groups: beta-diketones, mercaptoesters, benzotriazoles, benzothiazoles, and carboxylic acids; and
drying a coated aluminum-based part.

4. The process of claim 3, further comprising the steps of:
contacting a dried coated aluminum-based part with a solution to form an electrically conductive material layer upon a non-conductive material layer of said dried coated aluminum-based part, said solution includes a solvent and an electrically conductive material; and
drying a coated aluminum based part.

5. The process of claim 3, wherein contacting comprises contacting said aluminum-based article with a solution maintained at a pH range of about 3.5 to about 10.5.

6. The process of claim 3, wherein contacting comprises any one of the following processes: immersion, spraying or brushing.

7. The process of claim 3, wherein contacting comprises contacting said aluminum-based article with said solution for a period of time of about 1 minutes to about 10 minutes.

8. The process of claim 3, wherein contacting comprises contacting said aluminum-based article with said solution, said solution comprises an emulsion.

9. The process of claim 3, wherein contacting comprises contacting said aluminum-based article with said solution, said solution further comprises at least one of the following inorganic inhibitor species: a metal of Groups V, VI or the lanthanide series.

10. The process of claim 9, wherein contacting comprises contacting said aluminum-based article with said solution, said solution further comprises at least one of the following film forming agents: an oxide of a metal of Groups IV, V or VI.

11. The process of claim 3, further comprising pretreating an aluminum-based article to be coated prior to contacting said aluminum-based article with said solution.

12. A coated article, comprising:
   an article includes at least one surface having a coating disposed thereupon,
   wherein said coating includes at least one conductive polymer bonded to at least one intermetallic particle of said at least one surface,
   wherein said at least one conductive polymer includes a terminal end having a coupling agent bonded thereto, said coupling agent includes at least one of the following functional groups: beta-diketones, mercaptoesters, benzotriazoles, benzothiazoles, amines, or carboxylic acids; and
   wherein said at least one conductive polymer includes an organic-inorganic hybrid composite comprising an inorganic inhibitor species selected from the group consisting of a metal of Group V, a metal of Group VI, an element from the lanthanide series, and mixtures thereof, or at least one film forming agent selected from the group consisting of an oxide of a metal of Group IV, an oxide of a metal of Group V, an oxide of a metal of Group VI and mixtures thereof.

13. The coated article of claim 12, wherein said organic-inorganic hybrid composite comprises a single conductive polymer selected from the group consisting of polyaniline, polyacetylene, polypyrrole, polythiophene, poly(phenylene vinylene) and mixtures thereof.

14. The coated article of claim 12, wherein said organic-inorganic hybrid composite comprises a dual strand conductive polymer including a polymer selected from the group consisting of polyaniline, pilyacetylene, polypyrrole, plythiophene, and poly(phenylene vinylene) bonded to a polyanion comprising at least one of the following: polyacrylic acid, polysulfonic acid (such as poly(styrenesulfonic acid)) or polycarboxylic acids (such as poly(acrylic acid) or poly (methyl-methacrylate)).

* * * * *